United States Patent [19]

Hasegawa et al.

[11] 4,189,160
[45] Feb. 19, 1980

[54] SEALING CUP

[75] Inventors: Junzo Hasegawa, Obu; Masatoshi Yamada, Nagoya; Kaoru Nakamura, Anjo; Eiichi Yasuda, Nagoya, all of Japan

[73] Assignees: Aisin Seiki Kabushiki Kaisha, Kariya; Kabushiki Kaisha Toyota Chuo Kenkyusho, Nagoya; Toyota Jidosha Kogyo Kabushiki Kaisha, Toyota, all of Japan

[21] Appl. No.: 924,837

[22] Filed: Jul. 14, 1978

[30] Foreign Application Priority Data

Jul. 15, 1977 [JP] Japan .................... 52/95011[U]

[51] Int. Cl.² .............................................. F16J 15/32
[52] U.S. Cl. ...................................... 277/205; 277/124
[58] Field of Search ............... 277/205, 206 R, 124

[56] References Cited

U.S. PATENT DOCUMENTS

| 2,664,952 | 1/1954 | Losey | 277/205 X |
| 2,686,402 | 8/1954 | Samuel | 277/205 X |
| 2,720,924 | 10/1955 | Brown | 277/205 X |
| 2,815,995 | 12/1957 | Young | 277/205 |
| 2,867,457 | 1/1959 | Riesing et al. | 277/205 X |
| 2,884,291 | 4/1959 | Whitten | 277/205 |
| 3,527,507 | 9/1970 | Clark et al. | 277/205 X |
| 3,653,670 | 4/1972 | Sifri et al. | 277/205 X |

FOREIGN PATENT DOCUMENTS

| 529112 | 8/1956 | Canada | 277/205 |
| 2002082 | 1/1970 | Fed. Rep. of Germany | 277/205 |
| 1173682 | 10/1958 | France | 277/205 |
| 4516482 | 3/1965 | Japan | 277/205 |
| 1019523 | 2/1966 | United Kingdom | 277/205 |

Primary Examiner—Robert S. Ward, Jr.
Attorney, Agent, or Firm—Finnegan, Henderson, Farabow & Garrett

[57] ABSTRACT

A sealing cup to be used for a hydraulic piston-cylinder device the cup having an outer lip with a leading edge adapted to slide along a wall when fitted in the device. The angle $\alpha$ of the leading edge with respect to the cylinder axis is made smaller than the angle of a portion other than the leading edge with respect thereto, and is made as $1° \leq \alpha \leq 15°$ in the free condition of the cup. When the sealing cup is installed to be slid in the cylinder, a wedge-shaped clearance is formed between the leading edge and the cylinder wall due to provision of the angle $\alpha$, thereby admitting the fluid therein to decrease the slide resistance of the sealing cup.

10 Claims, 21 Drawing Figures

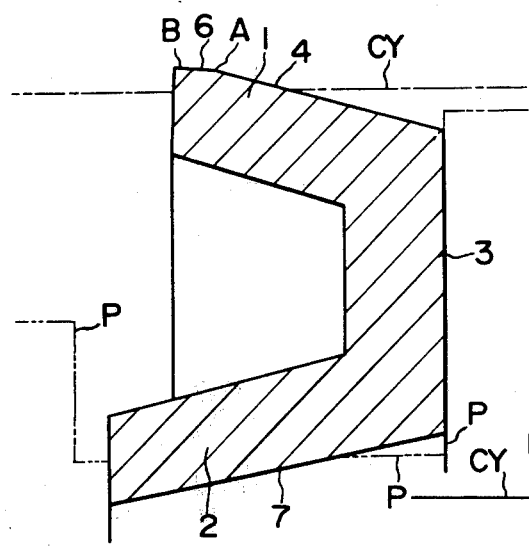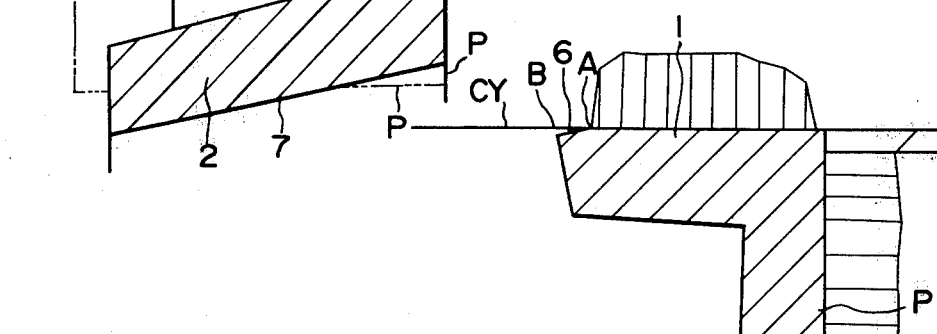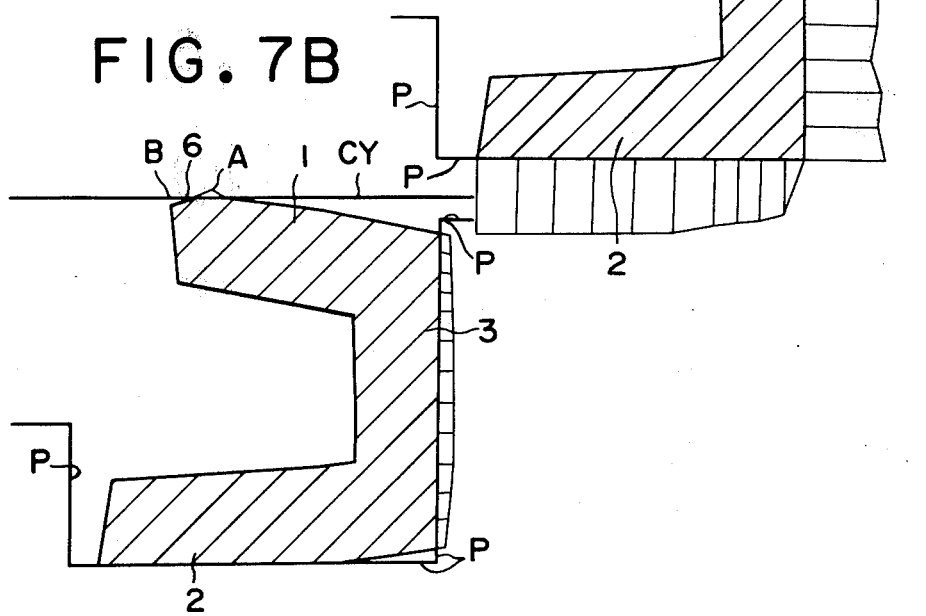

FIG. 9(A)(1)    FIG. 9(A)(2)
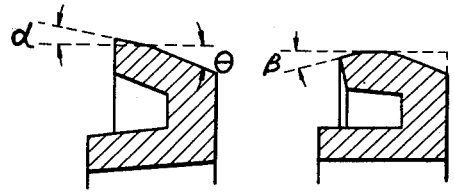
FIG. 9B
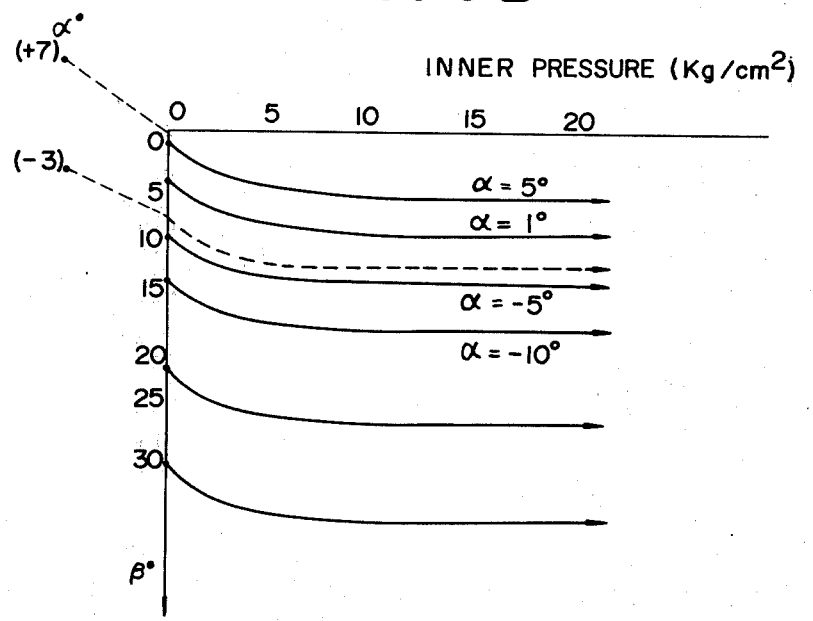

SEALING CUP

BACKGROUND OF THE INVENTION

1. Field of the Invention

This invention generally relates to a sealing cup adapted for use in vehicular devices and more particularly to improvements in a sealing cup to be mounted on any piston and cylinder for receiving the fluid pressure and for providing a fluid seal.

2. Description of the Prior Art

In vehicles, lots of devices have been employed for pressurizing the fluid in which a piston fitted within the cylinder and a cup mounted on the piston constitute a cylinder chamber to be pressurized by the relative movement of the piston and the cylinder. In the field of brake devices, too, various improvements have been made to sealing or piston cups (hereinafter simply referred to as brake cup) in order to increase the sealing effect from the view point of safety. As a result, the seal requirement of the brake cup has been satisfied.

Recently, a new requirement of vehicle drivers is to improved foot feeling upon depression of the brake pedal. That is to say, the brake device has to provide a brake pedal that may be smoothly depressed with little resistance and which will stop the vehicle with a small depression of the brake pedal.

More specifically, one of the major drawbacks of the conventional brake cup, although satisfactory as regards sealing, is the increased resistance to sliding due to shortage of the oil film formed between the slide surfaces. Therefore, a large foot force is necessary to pressurize the brake fluid, causing a poor pressurizing efficiency of brake fluid. In addition, stable movement of the piston in a conventional brake cup is effected due to stick-slip vibration resulting in unstable brake application.

SUMMARY OF THE INVENTION

Therefore, it is one of the objects of the invention to provide a sealing cup which may obviate the difficulties of the conventional one.

It is another object of the invention to provide a sealing cup in which the slide resistance thereof to a cylinder or a piston may be decreased to improve the pressurizing efficiency of fluid within the cylinder.

It is a further object of the invention to provide a sealing cup which provides a stable movement of the piston and increased durability.

According to the invention, a wedge-shaped clearance of a predetermined angle and shape is formed for example between the cylinder and the leading edge of the piston cup upon the fitting thereof between the piston and the cylinder, thereby permitting the oil admission into the wedge-shaped clearance when the piston cup slides with the piston movement. Thus, the lubrication of oil is increased and an oil film is formed on the sliding surfaces of the cylinder or the piston thereby decreasing the slide resistance. More specifically, an angle $\alpha$ of the leading edge of the outer peripheral wall of the piston cup with respect to the cylinder axis is made smaller than an angle $\theta$ of the remaining part of the peripheral wall thereof with respect to the cylinder axis when the piston cup is fitted between the piston and the cylinder, and the angle $\alpha$ is $1° \leq \alpha \leq 15°$. The angle $\alpha$ of the leading edge of the sealing cup is defined as inclination when unmounted toward a wall where the sealing cup is slidably contacted.

The above and additional objects and features of the invention will be more fully appreciated to those skilled in the art from a consideration of the following detailed explanation of preferred embodiments of the invention when taken in conjunction with the accompanying drawings.

BRIEF DESCRIPTION OF THE DRAWINGS

In the drawings:

FIGS. 7(A) to 7(C) show explanatory cross sections of the piston cup according to the invention wherein the leading edge angle thereof to the cylinder axis is 5°;

FIG. 9(A) (1) is schematic cross section of an unmounted cup of the invention;

FIG. 9(A) (2) is a schematic cross-section of a mounted cup of the invention;

FIG. 9(B) is a graph showing the range of the leading edge angles of the piston cup to the cylinder axis;

DETAILED EXPLANATION OF THE INVENTION

Figure 1:
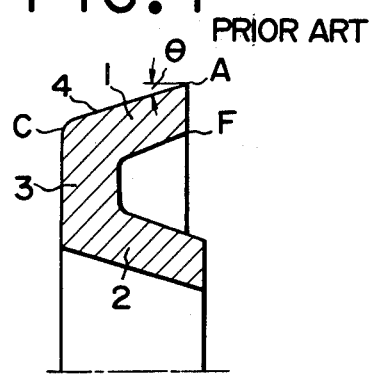
FIGS. 1 and 2 are sectional views of conventional piston cups an upper half of each of which is shown for simplicity when unmounted.
Figure 2:
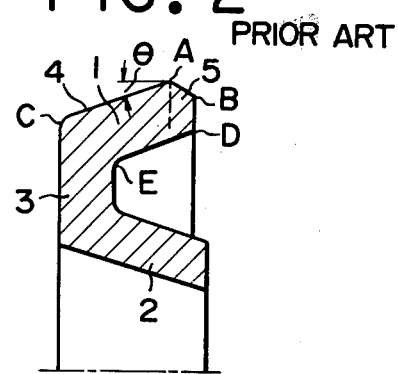
Figure 3:
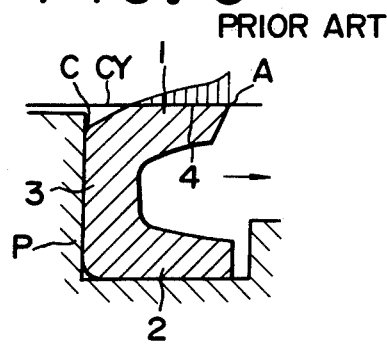
FIGS. 3 and 4 are views similar to FIGS. 1 and 2 but showing the conventional piston cups fitted between the piston and the cylinder.
Figure 4:
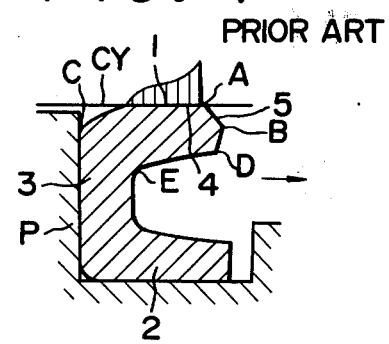

Referring first to FIGS. 1 to 4 wherein so-called ring cups are illustrated; cups of FIGS. 1 and 3 are called S.A.E. type while the cups of FIGS. 2 and 4 are called Opel type. Each of these conventional ring cups comprises an outer lip 1 substantially similar to the frustum of a cone, an inner lip 2, and a base 3. S.A.E. type cup of FIGS. 1 and 3 comprises a tip A at the maximum diameter portion of the outer lip 1 at which the maximum pressure is applied by contact of the cup with a cylinder CY. The Opel type cup of FIGS. 2 and 4 similarly comprises the maximum pressure portion A at the maximum diameter portion thereof, and a tip B with a gradually decreasing diameter portion 5 from the portion A, the tip angle to the cylinder axis being around 30°. After fitted to a piston P and the cylinder CY as shown in FIGS. 3 and 4, these cups are moved to the direction indicated by the arrow upon movement of the piston P with the slide resistance being produced between a sealing portion 4 of the outer lip 1 and the cylinder CY. More specifically, the fluid film may not be formed between the sealing portion 4 of the outer lip 1 and the cylinder CY because there is no provision of a leading edge to provide clearance in the case of the S.A.E. type cup as shown in FIG. 3, thereby causing the sealing portion 4 to be brought into direct contact with the cylinder CY and increasing the slide resistance therebetween.

When the sealing cup of FIG. 2 is fitted in the cylinder bore as shown in FIG. 4, the bendable lip portion is deformed under pressure when it comes into contact with the inner wall of the cylinder, so that the leading edge portion 5 is forced to be inclined and apart from the inner wall of the cylinder at an angle greater than when unmounted. As a result, the wedge effect is not easily obtained.

Figure 5:
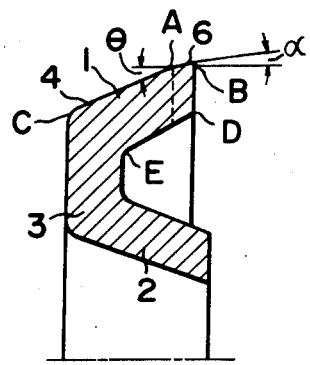
FIG. 5 is a sectional view of one embodiment of a piston cup in accordance with the invention an upper half of which is shown for simplicity when unmounted.
Figure 6:
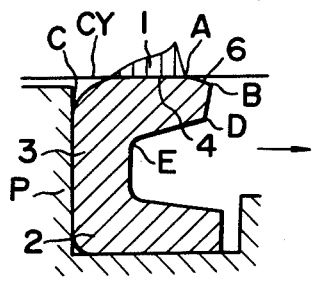
FIG. 6 is a view similar to FIG. 5 but showing the piston cup of the invention when fitted between the piston and the cylinder.

Referring now to FIG. 5, a piston cup of the invention comprises an outer lip 1 provided with a leading edge 6. The angle $\alpha$ of the leading edge 6 relative to the axis parallel to the cylinder axis is smaller when unmounted than the angle $\theta$ of the remaining portion 4 to the said axis $1° \leq \alpha \leq 15°$. Naturally, on the sealing wall 4 the portion A is at a position where the outer diameter of the piston cup is larger than the inner diameter of the cylinder. When the piston cup of FIG. 5 is installed between the piston P and the cylinder CY as seen in FIG. 6, the leading edge 6 will be inclined in relation to the cylinder wall with a relatively small angle. Accordingly, the wedge-shaped clearance is constituted between the leading edge 6 and the cylinder wall to form the oil film therebetween when the piston cup slides on the cylinder wall. As a consequence, the slide resistance of the cup will be decreased to realize various advantages such as a stable movement of the piston, improvement in the pressure increasing efficiency, and improvement in the durability of the cup.

Figure 8A:
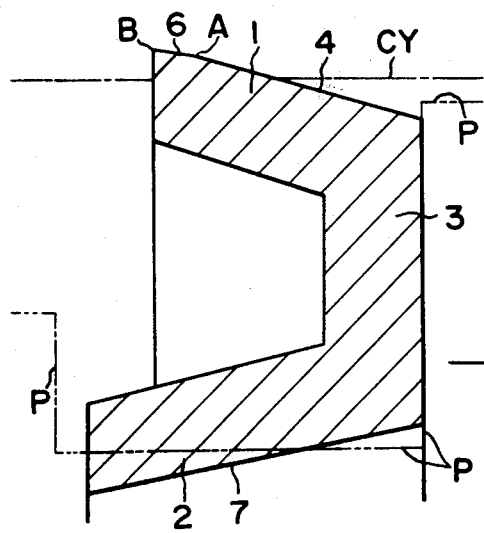
FIGS. 8(A) to 8(C) are views similar to FIGS. 7(A) to 7(C) but wherein the leading edge angle to the cylinder axis is 10°.
Figure 8B:
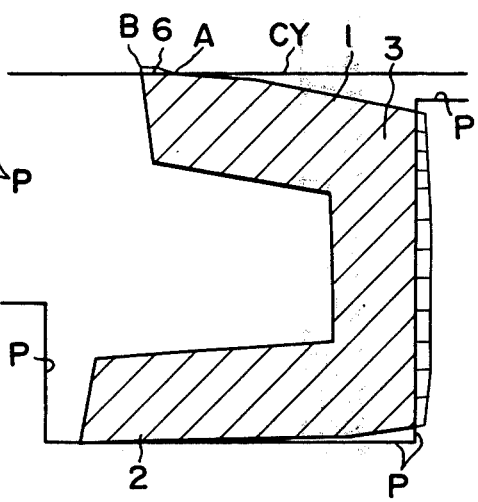
Figure 8C:
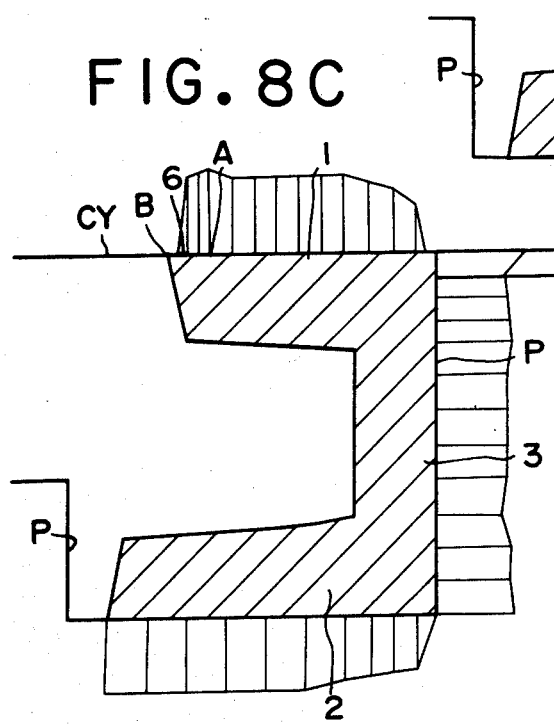

The change of the cup shape when the cup is installed in the cylinder due to the change of the angle $\alpha$ of FIG. 5 is analyzed with the condition of $\theta = 15°$ and $\alpha + 5°$ (FIGS. 7(A)-7(C)) or $\alpha = 10°$ (FIGS. 8(A)-8(C)).

The piston cup of FIG. 7(A) comprises an outer wall 7 of the inner lip 2 which includes a portion smaller in diameter than the outer diameter of the piston and the sealing wall 4 of the outer lip 1 which includes a portion larger in diameter than the inner diameter of the cylinder. Consequently, the piston cup receives bending force at the inner lip 2 thereof and at the outer lip 1 thereof when installed within the cylinder CY, as shown in FIG. 7(B) wherein the sealing pressure of the cup in contact with the cylinder CY and the piston P is also illustrated. FIG. 7(B) shows that the tip B of the outer lip 1 apart from the cylinder wall. When the inner pressure of 20 Kg/cm² is applied to the inner wall of the cup, it is apparent from the pressure distribution shown at the upper part of FIG. 7(C) that the leading edge 6 from the point A to the point B is apart from the cylinder wall CY.

Similarly, FIG. 8(B) shows that the leading edge is in contact with the cylinder wall when the piston cup is installed and FIG. 8(C) shows that when the inner pressure is applied the tip B of the leading edge is apart from the cylinder wall and the pressure at a portion of the edge is below the inner pressure.

It should be understood in FIG. 9(B) that the angle $\alpha$ be equal to or below 10° so as to release the tip of the lip from the cylinder in an effective way.

The fluid wedge operation of the piston cup having the inclination angle $\beta$ (FIG. 9(A)) when mounted has been proved effective in the fluid lubrication theory, i.e., the minimum thickness of the fluid film should be a few microns to dozens of microns in order to realize the fluid wedge operation in the most effective way, so that the inclination angle $\beta$ is a few degrees. In order to make the inclination angle $\beta$ a few degrees when the piston cup is fitted in the cylinder, the tip angle $\alpha$ preferably be designed as $1° \leq \alpha \leq 7°$ from FIG. 9(B). It is to be noted in FIG. 9(B) that the angle $\alpha$ may be designed as $1° < \alpha < 10°$ in order to accomplish the fluid wedge effect.

Figure 10:
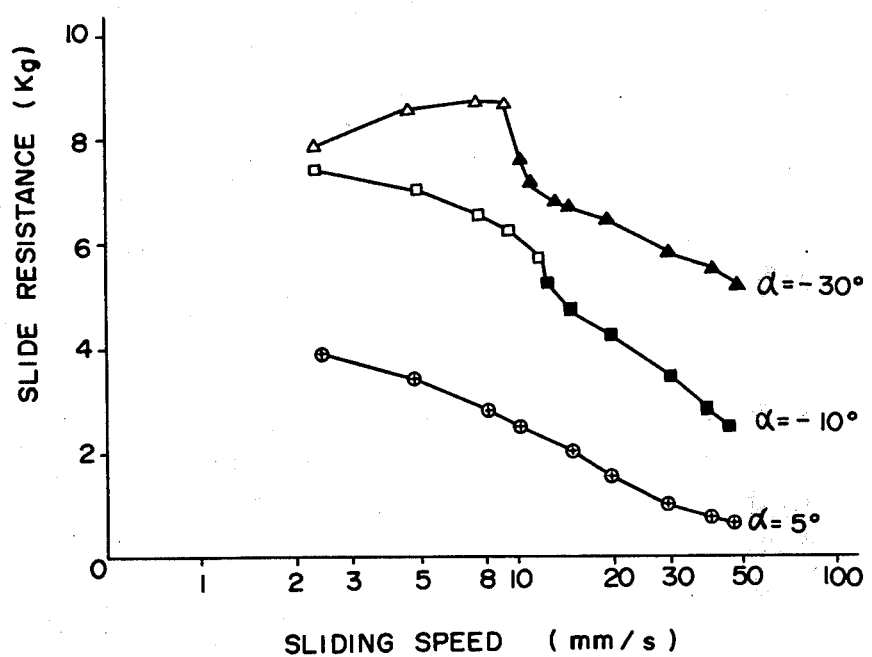
FIG. 10 is a graph showing the relationship between the slide resistance and the sliding speed with the leading edge angles of the piston cup to the cylinder being different.

FIG. 10 shows the test results of slide resistance with the angle $\alpha$ being different $-30°$, $-10°$, and $5°$ when the length 1 of the edge 6 is nearly equal to $0.15 \times L$ (L:Length of the sealing wall 4) and the angle $\theta$ is 15°. In the case of $\alpha = -30°$ as in the conventional Opel type cup, the fluid wedge operation is minimal because the leading edge is far apart from the cylinder, and the slide resistance is relatively large. Where the angle $\alpha = 1°$ or 5°; the resistance is gradually decreased with the increase in speed, and the fluid wedge operation is most effective. When the angle $\alpha$ is between 1° and 5°, since, as seen in FIG. 9(B), the slide resistance decreases where the angle $\alpha$ is increased from 1° to 5°.

The applicants have found also that the piston cup of the above-mentioned construction is very advantageous for use in the brake master cylinder of automotive vehicles.

Figure 11:
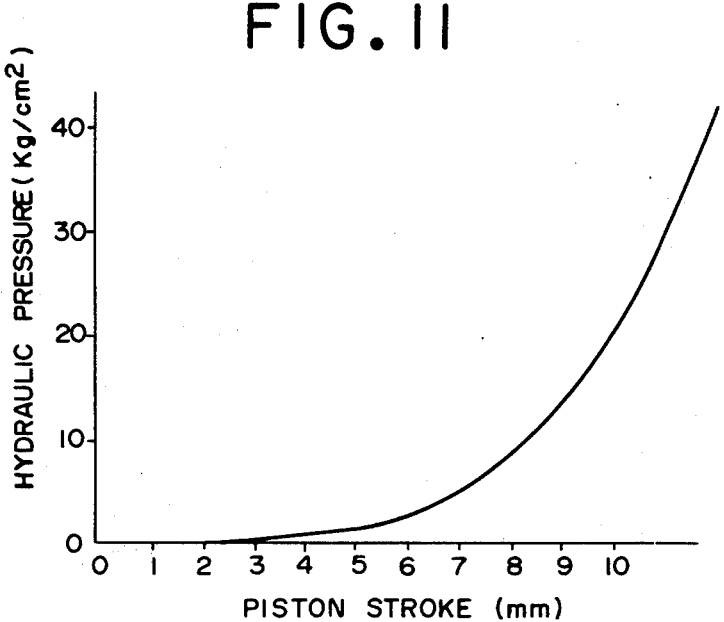
FIG. 11 is a graph showing the relationship between the fluid pressure and the piston stroke.
Figure 12:
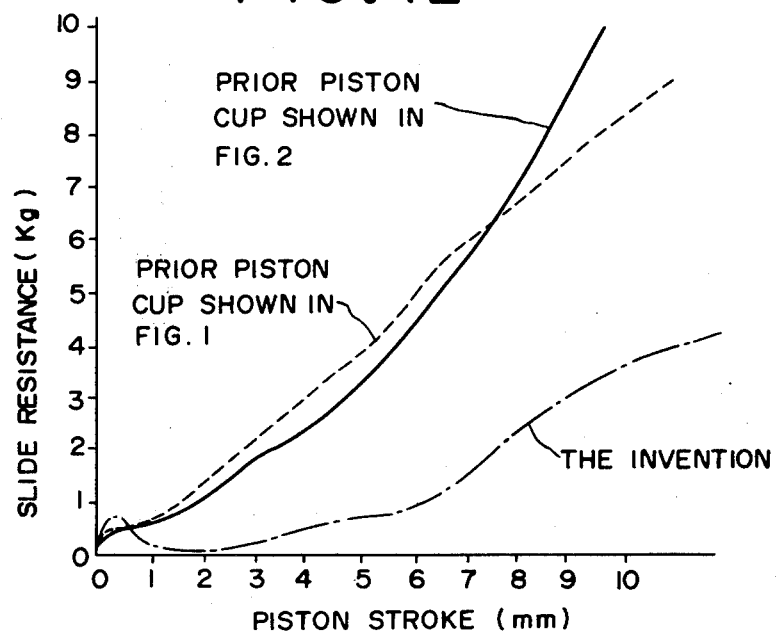
FIG. 12 is a graph showing the relationship between the slide resistance and the piston stroke in comparison of the piston cup of the invention with the conventional piston cups shown in FIGS. 1 and 2.

The pressure applied within the piston cup increases in accordance with the piston stroke as seen in FIG. 11. FIG. 12 shows the slide resistance of the prior art piston cups in comparison of the piston cup of the invention ($\alpha = 5°$) with the conventional piston cups shown in FIGS. 1 and 2, and proves the piston cup of the invention has far superior results.

Although the above explanation is based on the inclination angle $\theta = 15°$, the angle $\theta$ may be varied within the range of $10° \leq \theta \leq 30°$. In consideration of such range of the angle $\theta$, the leading edge angle $\alpha$ should be $1° \leq \alpha \leq 15°$ so as to realize the fluid wedge effect.

To summarize the above explanation, the positive limit of the angle range should be $\alpha \leq \frac{1}{2}\theta$ for the wedge effect to be effective, although the wedge effect may be expected to be the most effective when $\alpha \leq \frac{2}{3}\theta$.

The minimum limit of the angle range should be $\alpha \geq 1°$ and the decrease of the angle $\alpha$ (the increase of the absolute value of the angle $\alpha$) will not realize the fluid wedge effect.

The major factors for accomplishing the fluid wedge operation are the angle, the shape, and the size of the clearance formed between the leading edge of the piston cup and the cylinder (or the piston) when the cup is installed between the cylinder and the piston. The shape and the size of the clearance are primarily determined by the angle of the leading edge 6 of the lip and the pressure applied to the inside of the cup, and, secondarily, by the tightening clearance of the cup, and the shape and elasticity of the portion of the cup other than the leading edge. After the tests and the analysis of these factors, the applicants found that the range of $1°\leq\alpha\leq15°$ is optimum.

Figure 13:
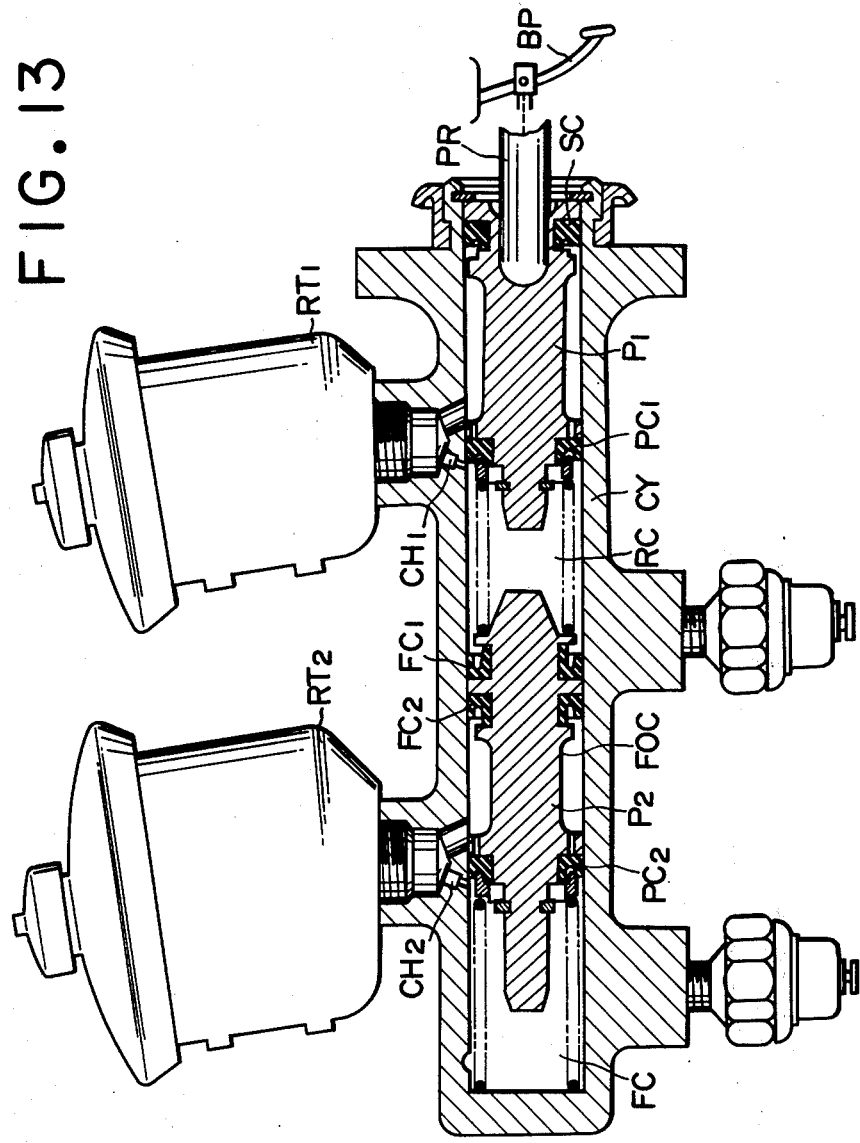
FIG. 13 is a cross section of a brake master cylinder in which the piston cups are used.
Figure 14:
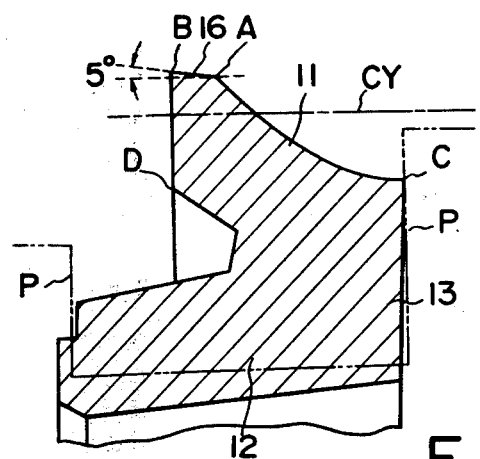
FIG. 14 is a cross section of the piston cup of the invention adapted for use as a secondary cup of the brake master cylinder of FIG. 13.

FIGS. 13 and 14 shows the piston cup of the invention which is being used as a secondary cup of a brake device. At first the brake master cylinder will be explained with reference to FIG. 13.

The tandem master cylinder CY comprises a first piston P1 and a second piston P2 each slidably fitted therein. The first piston P1 is provided with a secondary cup SC and a primary cup PC1. Similarly, the second piston P2 is provided with a primary cup PC2 and floating cups FC1 and FC2. When a brake pedal BP is depressed to push a rod PR, the primary cup PC1 is moved left in unison with the first piston P1 to close a compensation hole CH1 which is in fluid communication with a reservoir tank RT1. Thus, a fluid chamber RC of the rear wheel side is pressurized. The second piston P2 is also moved left due to pressure in the chamber RC so that the primary cup PC2 closes a compensation hole CH2, in fluid communication with a reservoir tank RT2 thereby pressurizing fluid chamber FC of the front wheel side.

The secondary cup SC mounted on the first piston P1 serves as a seal between the inside of the cylinder CY and the outside of first piston P1. The primary cups PC1 and PC2 of the pistons P1 and P2 serve to receive the fluid pressure. The floating cups FC1 and FC2 serve to seal between the rear side chamber RC and the front side chamber FC.

The secondary cup SC comprises an outer lip 11, as seen in FIG. 14, having an unbroken curve at the outer periphery thereof, and a leading edge 16 at the tip thereof. The leading edge 16 has an inclination angle of 5° with respect to the line passing through point A and parallel to the cylinder axis. When the cup is moved the wedge-shaped clearance is formed between the cylinder wall and the edge 16 of the cup so as to admit the fluid therein. Therefore, the slide resistance is decreased due to the oil film produced on the cylinder wall.

Figure 15:
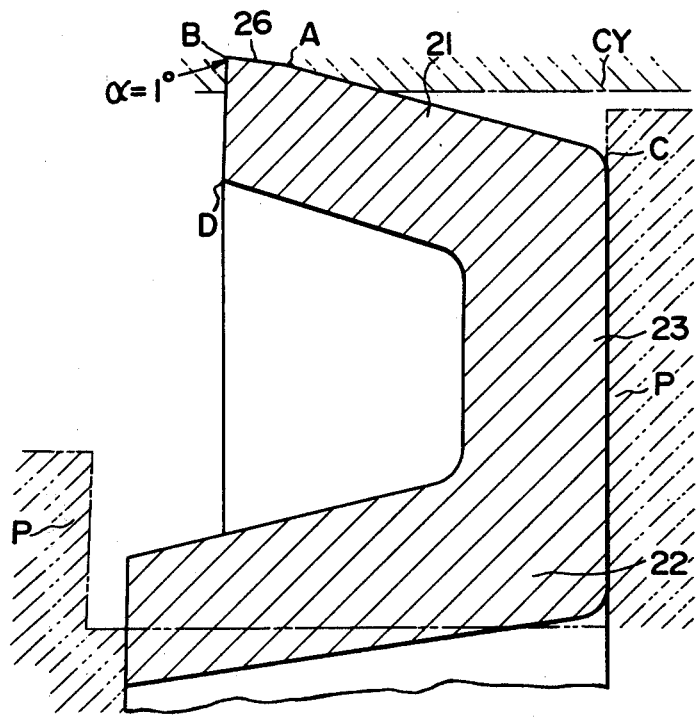
FIG. 15 is a cross section of the piston cup of the invention adapted for use as a primary cup of the brake master cylinder of FIG. 13.

FIG. 15 shows the piston cup of the invention which is used as a primary cup of the brake device.

The primary cup comprises a leading edge 26 of an outer lip 21 which is formed parallel to the cylinder axis (the leading edge angle $\alpha=1°$). The wedge-shaped clearance is similarly formed upon sliding movement of the primary cup so as to decrease the slide resistance.

The piston cup of the invention may be used as primary cup of the clutch device.

It should be noted that modifications of the invention are possible as long as the leading edge angle $\alpha$ of the cup with respect to the cylinder axis is $1°\leq\alpha\leq15°$. For instance, the piston cup of the invention may be employed in a proportioning valve device which will increase the wheel brake pressure with a reduced ratio relative to the master brake pressure. There are two kinds of piston cups used in the proportioning valve device; in one of which the outer lip of the cup slides with respect to the inner wall of cylinder and in the other of which the inner lip of the cup slides with respect to the outer wall of piston. The applicants of the invention have found that the leading edge angle $\alpha$ of any cup should be $1°\leq\alpha\leq15°$ so as to effect the fluid wedge operation in the most effective way. Otherwise, the angle $\alpha$ of the cup may be $1°\leq\alpha\leq7°$ depending on the inner pressure applied thereto and the tightening clearance thereof.

Figure 16:
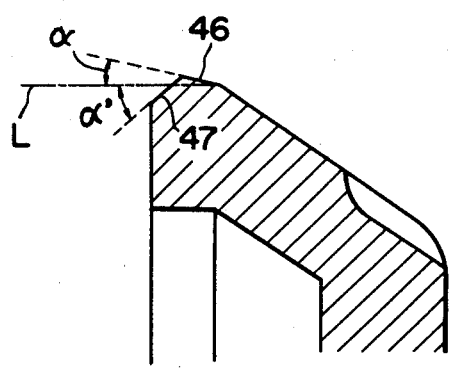
FIG. 16 is a sectional view of another embodiment of the invention.

FIG. 16 shows a modified embodiment of the present invention in which a further inclined surface 47 is provided on a leading edge 46 of the sealing cup. The surface 47 is inclined with respect to a line (L) in the direction opposite to the inclination indicated by $\alpha$ and such the inclination is designated by $\alpha'$ in FIG. 16. It is noted that the surface 47 is inclined in a way that the tip portion thereof is apart from the wall when mounted where the sealing cup is slidably contacted. The angle ($\alpha'$) is selected from the range of 0° to 45°. The preferable range of the angle ($\alpha'$) is 15° to 45°.

By the provision of the angle $\alpha'$, it is possible to avoid the objectionable adhesion of the tip of the piston cup to the cylinder wall which may be caused due to the manufacturing error of the angle $\alpha$, the expansion or the thermal deformation of the cup during use thereof, or the frictional force on the cup during sliding movement thereof.

Although the invention has been shown and described with respect to preferred embodiments, it is obvious that equivalent alterations and modification will occur to others skilled in the art upon the reading and understanding of this specification. The present invention includes all such equivalent alterations and modifications, and is limited only by the scope of the claims.

What we claim is:

1. A sealing cup for a hydraulic piston-cylinder device which comprises
   an annular body of a resilient material including an annular base,
   an annular inner sealing lip extending from said annular base and having an inner sealing surface adapted to be engaged with a wall to be sealed,
   an annular outer sealing lip extending from said annular base so as to encircle said inner sealing lip in spaced relation therewith, and having an outer sealing surface adapted to be engaged with a wall surface of said cylinder to be sealed, said cylinder having a longitudinal axis,
   one of said inner and outer sealing surfaces being slidably movable with respect to a corresponding one of said piston and cylinder walls, and
   said slidably movable sealing surface having a tip part including a first annular portion inclined at an angle $\theta$ and a second annular portion forwardly of said first annular portion inclined at an angle $\alpha$ with respect to the axis of said cylinder, said first and second annular portions being inclined in the same direction with respect to said cylinder axis,
   said first annular portion including an intermediate portion which is larger in diameter than that of said cylinder when it is provided on said outer sealing surface and smaller in diameter than said piston when provided on said inner sealing surface,
   the angle $\alpha$ being smaller than the angle $\theta$ and being predetermined as follows;

$1°\leq\alpha\leq15°$ whereby, on mounting said cup between said cylinder and piston, said inclined portion forms a wedge-shaped clearance between itself and said peripheral wall and guides fluid such as oil to a sliding surface of said at least one of said cylinder and piston.

2. A sealing cup for a hydraulic piston-cylinder device in accordance with claim 1, which further comprises
   an edge portion provided at a tip part of said inclined portion, the angle $\alpha'$ of said edge portion with respect to the axis of said cylinder being negative relative to the angle $\alpha$ of said inclined portion with respect to said axis and being larger than that of said inclined portion, said angle $\alpha'$ being predetermined as follows;

$$-15° < \alpha' \leq -45°.$$

whereby, on mounting said cup between said cylinder and piston, said edge portion retains the fluid such as oil within a triangle shape clearance formed between said peripheral wall of said edge portion and one of said piston and said cylinder walls and guides said fluid to said wedge shaped clearance, and reduces the sliding resistance of said sliding surface of said at least one of said cylinder and piston.

3. A sealing cup for a hydraulic piston-cylinder device in accordance with claim 1, in which
said angle $\alpha$ of said annular inclined portion is predetermined as follows;

$$1° \leq \alpha < 7°.$$

4. A sealing cup for a hydraulic piston-cylinder device in accordance with claim 1, in which
said angle $\alpha$ of said annular inclined portion has a following relation to said angle $\theta$ of the other part of said at least one of said inner and outer sealing surfaces with respect to the axis of said cylinder, $$\alpha \leq \tfrac{1}{3}\theta.$$

5. A sealing cup for a hydraulic piston-cylinder device in accordance with claim 2, in which
said angle $\alpha'$ of said edge portion is predetermined as follows;

$$\alpha' = -30°.$$

6. A sealing cup for a hydraulic piston-cylinder device in accordance with claim 1, in which
fluid under predetermined pressure is applied to said inner wall of said cup mounted between a brake master cylinder and a piston and said inclined portion is formed on said outer sealing surface.

7. A sealing cup for a hydraulic piston cylinder device in accordance with claim 2, in which
fluid under the predetermined pressure is applied to said inner wall of said cup mounted between a brake master cylinder and a piston, and said inclined portion and edge portion being formed on said outer sealing surface.

8. A sealing cup for a hydraulic piston cylinder device in accordance with claim 7, in which
the angle $\alpha$ of said annular inclined portion is 5° and the angle $\alpha'$ of said edge portion is $-30°$.

9. A sealing cup for a hydraulic piston-cylinder device in accordance with claim 2, in which
said angle $\alpha$ of said annular inclined portion is predetermined as follows:

$$1° \leq \alpha < 7°.$$

10. A sealing cup for a hydraulic piston-cylinder device in accordance with claim 2, in which
said angle $\alpha$ of said annular inclined portion has the following relation to said angle $\theta$ of the other part of said at least one of said inner and outer sealing surface with respect to the axis of said cylinder:

$$\alpha \leq \tfrac{1}{3}\theta.$$

* * * * *